United States Patent
Ito et al.

(10) Patent No.: US 7,424,573 B2
(45) Date of Patent: Sep. 9, 2008

(54) INFORMATION PROCESSING APPARATUS, METHOD, AND PROGRAM FOR FORMATTING MULTIPLE RECORDING MEDIA INTEGRATED AS ONE

(75) Inventors: Ryogo Ito, Tokyo (JP); Fumihiko Kaise, Tokyo (JP)

(73) Assignee: Sony Corporation, Tokyo (JP)

( * ) Notice: Subject to any disclaimer, the term of this patent is extended or adjusted under 35 U.S.C. 154(b) by 184 days.

(21) Appl. No.: 11/461,672

(22) Filed: Aug. 1, 2006

(65) Prior Publication Data

US 2007/0050531 A1    Mar. 1, 2007

(30) Foreign Application Priority Data

Aug. 25, 2005   (JP) .............................. 2005-244610

(51) Int. Cl.
   *G06F 12/00*   (2006.01)
(52) U.S. Cl. ...................... 711/112; 711/170; 711/202; 711/4; 711/5
(58) Field of Classification Search ........................ None
   See application file for complete search history.

(56) References Cited

U.S. PATENT DOCUMENTS

| | | | |
|---|---|---|---|
| 5,664,141 A | * | 9/1997 | Yamamuro ................... 711/111 |
| 5,813,025 A | * | 9/1998 | Murphy et al. .............. 711/114 |
| 5,969,893 A | * | 10/1999 | Basham et al. ................ 360/49 |
| 6,016,530 A | * | 1/2000 | Auclair et al. ................. 711/6 |
| 6,049,436 A | * | 4/2000 | Wu ............................. 360/27 |

FOREIGN PATENT DOCUMENTS

JP        2005/141335        6/2005

* cited by examiner

*Primary Examiner*—Jack A Lane
(74) *Attorney, Agent, or Firm*—Bell, Boyd & Lloyd LLP

(57) ABSTRACT

An information processing apparatus reads and writes information in a plurality of recording media is provided. The apparatus includes a formatting determination section which, in the case of formatting the recording media, determines whether or not the recording media are to be formatted by handling the recording media as an integrated recording medium, and an integrated formatting section which, when the formatting determination section determines that the recording media are to be formatted by handling the recording media as the integrated recording medium, formats the recording media by handling the recording media as the integrated recording medium.

9 Claims, 17 Drawing Sheets

INFORMATION PROCESSING APPARATUS, METHOD, AND PROGRAM FOR FORMATTING MULTIPLE RECORDING MEDIA INTEGRATED AS ONE

CROSS REFERENCES TO RELATED APPLICATIONS

The present application claims priority to Japanese Patent Application JP 2005-244610 filed in the Japanese Patent Office on Aug. 25, 2005, the entire contents of which are incorporated herein by reference.

BACKGROUND

The present invention generally relates to information processing apparatuses and methods, and programs and recording media used therewith, and, in particular, to an information processing apparatus and method that ensure fast accessing of a file, and a program and recording medium used therewith.

In recent years, it has frequently been performed that, after an image captured with a camera is converted into digital data, the digital data is subject to processing such as editing. In this case, in many cases, the image data is temporarily recorded in a recording medium. It is common that management of data recording positions in the recording medium is performed in, for example, a file system such as FAT16 (file allocation table 16) or FAT32 (file allocation table 32). In the file system such as FAT16 or FAT32, chain information of data recorded in a form divided into clusters in the recording medium is managed by using a FAT. For example, when a file is read from the recording medium, data formed by a set of clusters is read by referring to the FAT.

As described above, when a file is read from a recording medium, reference to a FAT is frequently performed. Accordingly, for fast reading of a file, fast accessing of the FAT is preferable. Accordingly, the present assignee has proposed a technology (see, for example, Japanese Unexamined Patent Application Publication No. 2005-141335) for realizing fast file access by reducing a time necessary for referring to a FAT. In this technology, the time is reduced by loading a FAT from an HDD (hard disk drive) into a buffer memory including fast-writable-and-readable SDRAM (synchronous dynamic random access memory) at the time of system initialization, and executing file access by referring to the FAT stored in the buffer memory.

When an HDD having, for example, 30 GB (gigabytes), is formatted, with each cluster size set to 32 KB (kilobytes), the size of a FAT reaches nearly 4 MB (megabytes). Accordingly, there is a limited number of apparatuses in each of which an SDRAM having such a large FAT size is used as a buffer memory, and it may be difficult for some apparatus to store the FAT in the buffer memory.

SUMMARY

According to an embodiment of the present invention, there is provided an information processing apparatus for reading or writing information in a plurality of recording media, the information processing apparatus including formatting determination means for determining, in the case of formatting the recording media, whether or not the recording media are to be formatted by handling the recording media as an integrated recording medium, and integrated formatting means for formatting, when the formatting determination means determines that the recording media are to be formatted by handling the recording media as the integrated recording medium, the recording media by handling the recording media as the integrated recording medium.

Preferably, the integrated formatting means creates a master boot record of the integrated recording medium so that the sum of the numbers of sectors of the recording media is the number of sectors of the integrated recording medium.

The integrated formatting means may locate the master boot record in a start sector which is included in the integrated recording medium and which is located in, among the recording media, a first recording medium capable of faster data reading and writing compared with the other recording media, and the integrated formatting means may locate management information of the integrated recording medium so as to follow the master boot record.

The management information may include a file allocation table of the integrated recording medium.

The management information may include a directory entry.

The information processing apparatus may further include branch point storage means for storing, as a branch point, an address representing an end sector of a first recording medium among the recording media, the branch point being located between the first recording medium and a second recording medium among the recording media in which data having a recording size greater than a recording size of the first recording medium is recorded and which is used for data recording next to data recording in the first recording medium.

When data recorded in the integrated recording medium is accessed, the information processing apparatus may determine whether or not an address representing the data is greater than a value representing the branch point. When the address representing the data is greater than the value representing the branch point, the second recording medium may be accessed, and, when the address representing the data is not greater than the value representing the branch point, the first recording medium may be accessed.

According to another embodiment of the present invention, there is provided an information processing method for reading or writing information in a plurality of recording media, the information processing method including the steps of, in the case of formatting the recording media, performing determination of whether or not the recording media are to be formatted by handling the recording media as an integrated recording medium, and, when the result of the determination indicates that the recording media are to be formatted by handling the recording media as the integrated recording medium, formatting the recording media by handling the recording media as the integrated recording medium.

According to another embodiment of the present invention, there is provided a computer-readable program for allowing an information processing apparatus to execute information processing, the information processing apparatus reading or writing information in a plurality of recording media, the program including the steps of, in the case of formatting the recording media, controlling determination of whether or not the recording media are to be formatted by handling the recording media as an integrated recording medium, and, when the result of the determination indicates that the recording media are to be formatted by handling the recording media as the integrated recording medium, controlling formatting of the recording media by handling the recording media as the integrated recording medium.

According to an embodiment of the present invention, in the case of formatting the recording media, it is determined whether or not the recording media are to be formatted by handling the recording media as an integrated recording medium, and, when it is determined that the recording media are to be formatted by handling the recording media as the integrated recording medium, the recording media are formatted by handling the recording media as the integrated recording medium.

According to an embodiment of the present invention, it is ensured that fast file accessing can be performed.

Additional features and advantages are described herein, and will be apparent from, the following Detailed Description and the figures.

A detailed description with reference to the accompanying drawings is provided below.

DETAILED DESCRIPTION

An information processing apparatus as provided reads or writes information in a plurality of recording media, and includes formatting determination means (e.g., the application 201 shown in FIG. 11 for executing step S102 in FIG. 13) which, in the case of formatting the recording media, determines whether or not the recording media are to be formatted by handling the recording media as an integrated recording medium, and integrated formatting means (e.g., the integrated device driver 401 shown in FIG. 11 for executing step S103 in FIG. 12) which, when the formatting determination means determines that the recording media are to be formatted by handling the recording media as the integrated recording medium, formats the recording media by handling the recording media as the integrated recording medium.

In this information processing apparatus, the integrated formatting means may locate the master boot record in a start sector which is included in the integrated recording medium and which is located in, among the recording media, a first recording medium capable of faster data reading and writing compared with the other recording media, and the integrated formatting means may locate management information (e.g., the PBR, FAT1, FAT2, root directory entry shown in FIG. 9) of the integrated recording medium so as to follow the master boot record.

Figure 8:
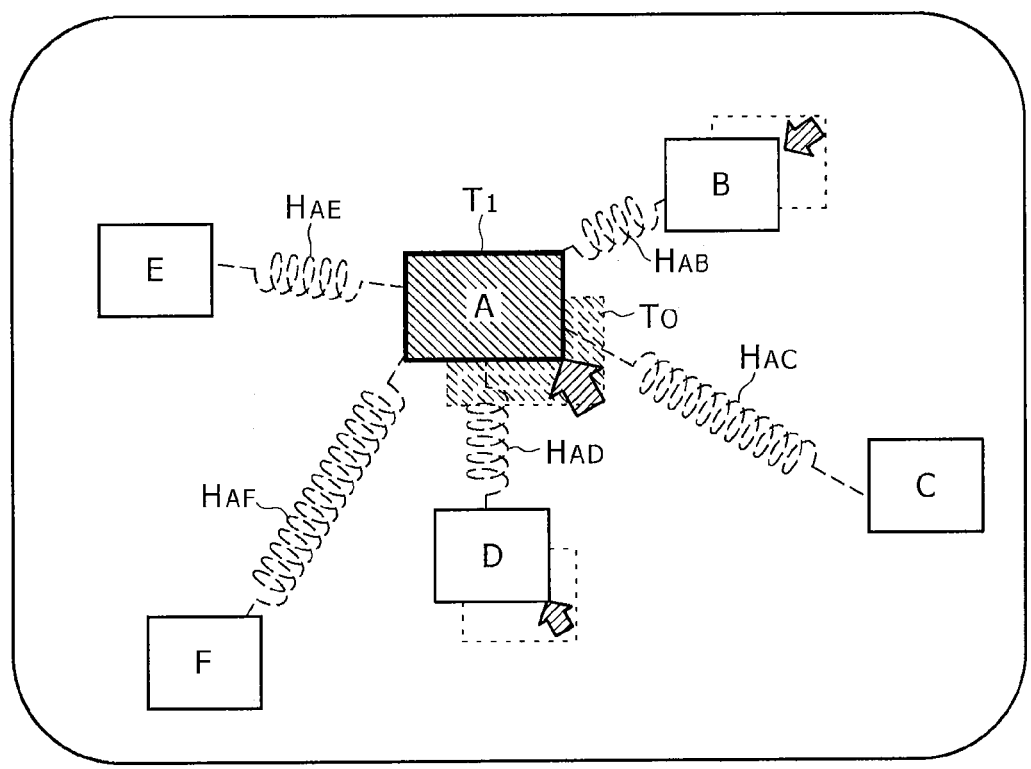
FIG. 8 is an illustration of an example of the configuration of a directory entry.

In this information processing apparatus, the management information may include a directory entry (e.g., the directory entry shown in FIG. 8).

This information processing apparatus may further include branch point storage means (e.g., the integrated device driver 401 shown in FIG. 11 for executing step S134 in FIG. 13) in which an address representing an end sector of a first recording medium among the recording media is stored as a branch point between the first recording medium and a second recording medium among the recording media in which data having a recording size greater than a recording size of the first recording medium is recorded and which is used for data recording next to data recording in the first recording medium.

In this information processing apparatus, when data recorded in the integrated recording medium is accessed, it may be determined (for example, in step S203 in FIG. 15) whether or not an address representing the data is greater than a value representing the branch point. When the address representing the data is greater than the value representing the branch point, the second recording medium may be accessed, and, when the address representing the data is not greater than the value representing the branch point, the first recording medium may be accessed.

An information processing method according to another embodiment of the present invention reads or writes information in a plurality of recording media, and may include the steps of, in the case of formatting the recording media, performing determination (for example, in step S102 in FIG. 13) of whether or not the recording media are to be formatted by handling the recording media as an integrated recording medium, and, when the result of the determination indicates that the recording media are to be formatted by handling the recording media as the integrated recording medium, formatting (for example, in step S103 in FIG. 12) the recording media by handling the recording media as the integrated recording medium.

Figure 1:
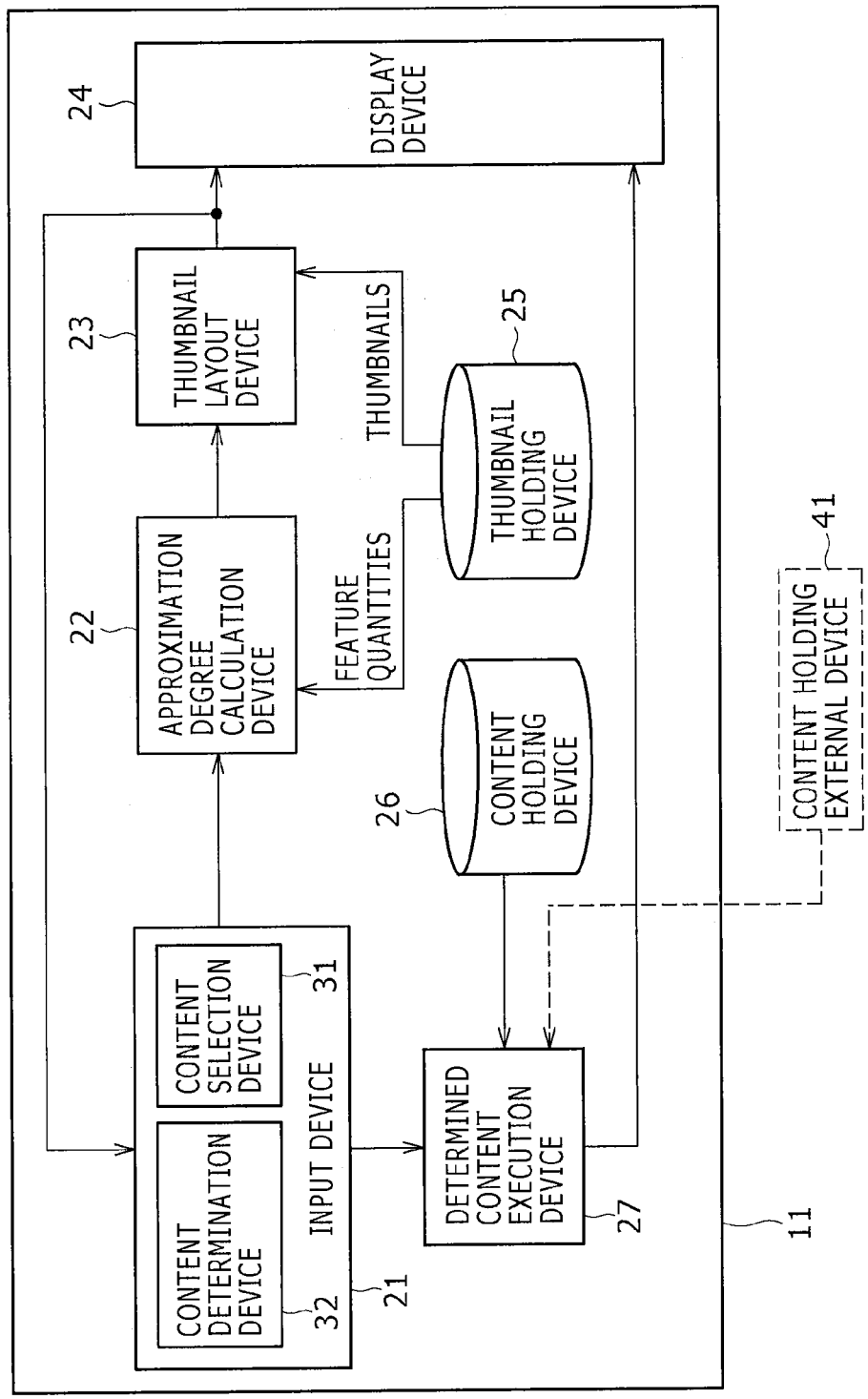
FIG. 1 is a block diagram showing an example of the configuration of a recording-playback apparatus to which an embodiment of the present invention is applied.

An embodiment of the present invention is described below with reference to the accompanying drawings. FIG. 1 shows an example of the configuration of a recording-playback apparatus 100 to which an embodiment of the present invention is applied. The recording-playback apparatus 100 is formed by, for example, a digital still camera, a digital video camera, or the like. The recording-playback apparatus 100 records data of a captured image (or audio) on a recording medium such as a magnetic disk, an optical disk, a magneto-optical disk, or a semiconductor memory, and plays back an image (audio) recorded in the recording medium.

Referring to FIG. 1, under the control of a camera function unit 102, an optical lens 101 collects light of a subject image and focuses the collected light in a photoelectric conversion unit 103.

Under the control of a CPU (central processing unit) 161, the camera function unit 102 performs initiating and finishing an operation for capturing an image of the subject through the optical lens 101, and appropriately controlling a zoom factor of the optical lens 101, a captured amount of light, etc.

The photoelectric conversion unit 103 is formed by a photoelectric conversion element such as a CCD (charge-coupled device) or C-MOS (complementary-metal oxide semiconductor). The photoelectric conversion unit 103 converts light supplied from the optical lens 101 into an electric signal and supplies the electric signal to an image signal processing unit 104.

The image signal processing unit 104 generates image data based on the signal supplied from the photoelectric conversion unit 103. Under the control of, for example, a CPU 161, the image signal processing unit 104 performs analog-to-digital conversion on an analog signal corresponding to the subject image to generate digital image data, and uses image processing, such as white balance adjustment or defective pixel interpolation, on the image data. Also, under the control of the CPU 161, the image signal processing unit 104 performs image data compression coding in accordance with a standard such as MPEG (Motion Picture Experts Group) or JPEG (Joint Photographic Expert Group), and performs decoding on compression-coded image data.

The image signal processing unit 104 also performs analog-to-digital conversion on the analog signal corresponding to the subject image before performing white balance adjustment, or supplies an image input/output unit 105 and display 106 with data of an image in which defective pixels are interpolated. More specifically, the image signal processing unit 104 converts the image data into, for example, RGB (red, green, blue) signals for use in an input system of the display 106, and supplies the RGB signals to the display 106. Similarly, the image signal processing unit 104 supplies the RGB signals also to the image input/output unit 105.

The image input/output unit 105 supplies the image signal processing unit 104 with, for example, an image signal supplied from an external apparatus, and outputs, to the external apparatus, the signals which are output from the image signal processing unit 104 and which correspond to the image data. The display 106 is formed by, for example, a liquid crystal display or the like, and displays an image based on the image signals output from the image signal processing unit 104.

An audio input/output unit 121 supplies an audio processing unit 122 with, for example, an audio signal of sounds collected by using a microphone or the like, and also outputs, to the speaker or the like, audio corresponding to audio data output from the audio processing unit 122. Under the control the CPU 161, on the basis of the audio signal supplied from the audio input/output unit 121, the audio processing unit 122 generates data of compression-coded audio and decodes data of compression-coded audio.

A RAM (Random Access Memory) 141 stores a program read from a recording medium loaded into a drive 145, data generated in processing based on the program, etc., and supplies the stored content to the CPU 161, if necessary. A ROM 142 supplies data stored beforehand to the CPU 161, if necessary.

An operation input unit 143 includes, for example, operation keys or buttons, and outputs, to the CPU 161, a signal corresponding to an operation input by a user.

A communication unit 144 includes, for example, a network card, and functions as a wired communication interface such as the Ethernet or a USB (Universal Serial Bus), or as a wireless communication interface such as IEEE 802.11a/b/g or Bluetooth. Under the control of the CPU 161, the communication unit 144 establishes communication with a network-connected different apparatus.

In the drive 145, various types of recording media are loaded which include, for example, a magnetic disk such as a hard disk, an optical disk such as a DVD (digital versatile disk), a magneto-optical disk such as MD (Mini-Disk), a semiconductor memory such as a flash memory or a Memory Stick. By accessing a loaded recording medium, the drive 145 records data and reads recorded data.

A power supply 145 supplies power necessary for driving the recording-playback apparatus 100.

The CPU 161 performs data processing by performing various types of calculations and controls the operation of the entirety of the recording-playback apparatus 100.

Figure 2:
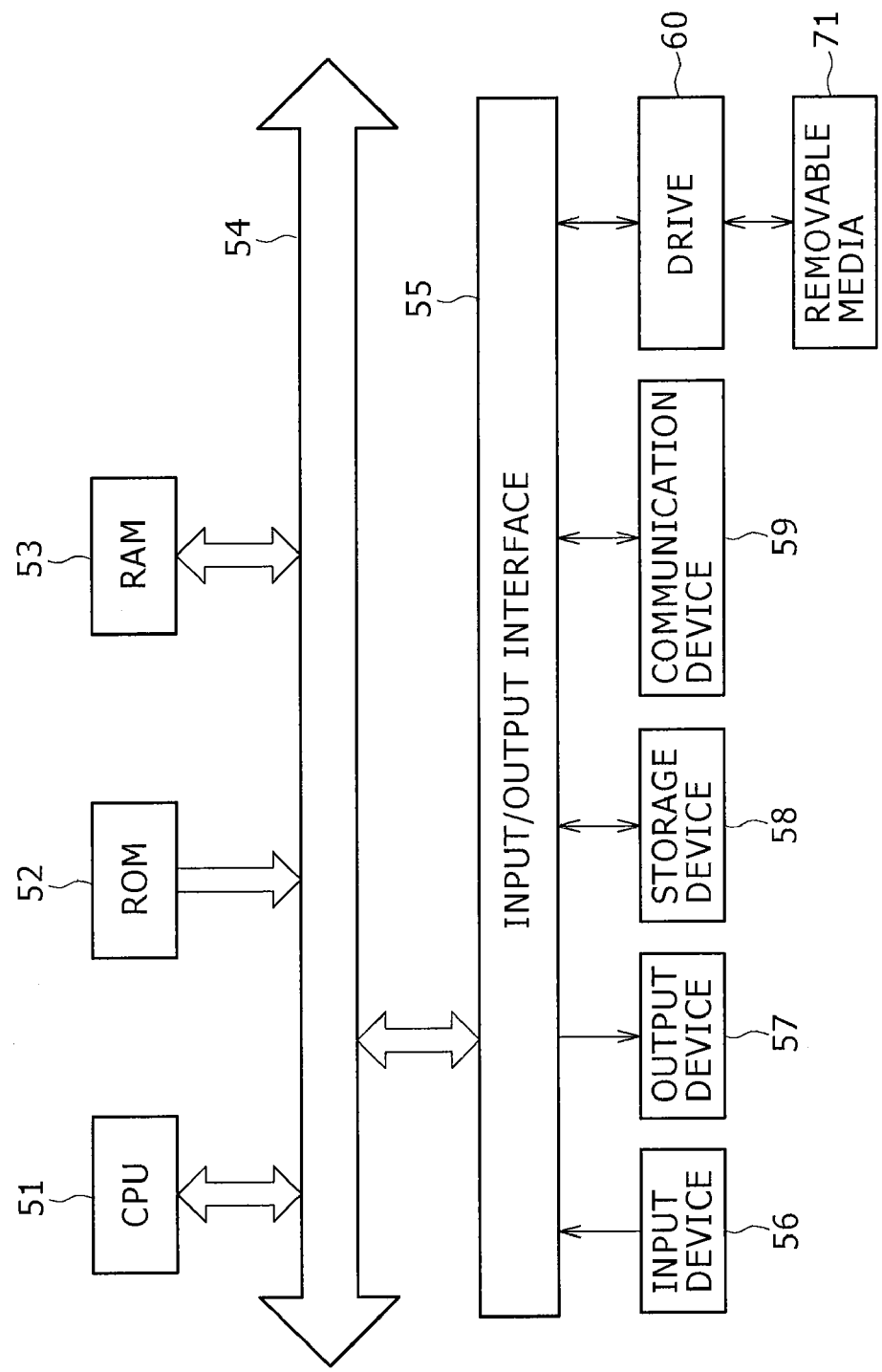
FIG. 2 is a block diagram illustrating a mechanism of recording data to a recording medium or of reading data from the recording medium in the recording-playback apparatus shown in FIG. 1.

FIG. 2 shows a mechanism of recording data to a recording medium 204 or of reading data from the recording medium 204 in the recording-playback apparatus 100. In FIG. 2, an application 201 belongs to the highest layer of software executed by the CPU 161, and controls, for example, video recording or playback processing. The application 201 accesses data whose recording or playback is necessary in processing implemented by the application 201 in units of, for example, files each including predetermined recording units. When the application 201 accesses a predetermined file, the application 201 outputs an access request to a file system 202.

The file system 202 is software for managing information concerning locations of files in the recording medium 204, and the software is executed by the CPU 161. The file system 202 is formed on the basis of, for example, FAT16 or FAT32. Details of FAT32 are disclosed in "Microsoft Extensible Firmware Initiative FAT32 File System Specification".

The file system 202 decomposes a file whose accessing is requested by the application 201 into clusters each including a predetermined number of bits, and accesses the file in units of the clusters. For example, when the application 201 requests the application 201 to read a file, the file system 202 searches for, as a requested cluster, a cluster in which real data of the file is recorded. Also, when the application 201 requests the file system 202 to write a file, the file system 202, the file system 202 searches for, as a requested cluster, a free cluster in which the real data of the file can be written.

The file system 202 converts the found requested cluster into an LBA (Logical Block Addressing) value, and requests a device driver 203 to perform accessing in units of sectors. Also, on the basis of a response supplied from the device driver 203 in response to the access request output by the file system 202, the file system 202 outputs, to the application 201, a response to the file access request.

The device driver 203 is software for controlling the operation of the drive 145, and this software is executed by the CPU 161. In response to the access request from the file system 202, the device driver 203 controls the drive 145 to access the loaded recording medium 204 in units of sectors. This allows the drive 145 to access the requested sector in the loaded recording medium 204. Here, a sector is a recording unit smaller than a cluster (formed by a plurality of sectors), and a sector to be accessed is specified by LBA. In addition, in response to a response supplied from the recording medium 204 (actually the drive 145) on the basis of the sector unit access request output by the device driver 203, the device driver 203 outputs, to the file system 202, a response to the cluster access request.

In response to the access request from the device driver 203, the recording medium 204 (the drive 145) writes (records) data in the sector whose accessing is requested, or reads data from the sector whose accessing is requested, and outputs the result of writing or reading, as a response to the sector access request, to the device driver 203. For example, when being requested by the device driver 203 to read data in units of sectors, the recording medium 204 supplies the device driver 203 with data recorded for each sector.

Next, a detailed configuration of data managed in the file system 202 is described below with reference to FIGS. 3 and 4.

Figure 3:
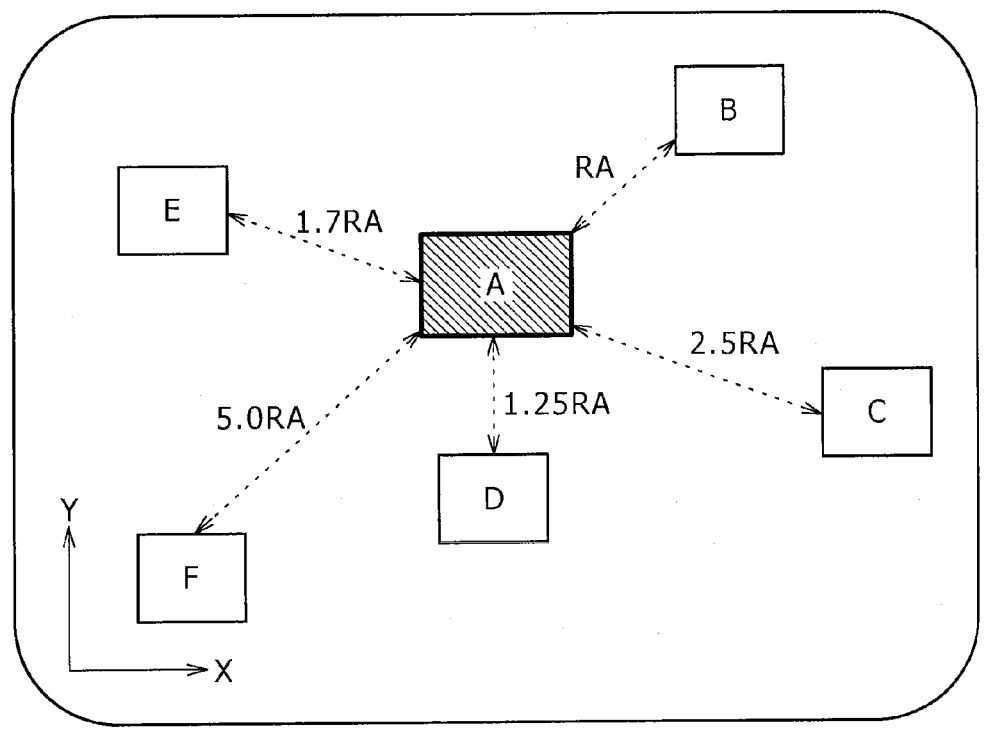
FIG. 3 is an illustration of an example of the configuration of data recorded in the recording medium shown in FIG. 2.

FIG. 3 shows an example of a detailed configuration of data recorded in the recording medium 204 when the file system 202 complies with FAT16. Referring to FIGS. 3 and 4, data items recorded in the recording medium 204 are shown from top to bottom from a start data item in order in which the data items are located in the recording medium 204.

In FIG. 3, in a sector which is represented by LBA=0 and which is a start sector of the data in the recording medium 204, an MBR (master boot record) is positioned which includes an activation code, and information, such as start and end sectors of each partition and its size, concerning partitions that are recording units of the data recorded in the recording medium 204.

A PBR (partition boot record), FAT1, FAT2, a root directory entry, and clusters, which are positioned following a free area next to the MBR, are recorded as a partition in the data in the recording medium 204.

The PBR is information including the number of clusters in the recording medium 204, and a partition activation code, and is loaded into memory at the time of operating system activation.

Each of FAT1 and FAT2 is a table having chain information of file-forming clusters, and either is referred to when the file system 202 reads or writes a file. Normally, FAT1 and FAT2 are identical in recording content (copies of the same table).

In the root directory entry, a directory entry corresponding to each file recorded in the root directory of the recording medium 204 is stored. For example, when a plurality of files are recorded in the root directory of the recording medium 204, in the root directory entry, directory entries each including information related to each file are formed correspondingly to the plurality of files. Each directory entry stores information such as the name of a corresponding file, a file creation date, the size of the file, and a start cluster number of the file.

In one partition, data recorded in the PBR to the root directory entry is management information of the data in the partition, and, in the plurality of clusters following the root directory entry, real data (e.g., image data) is recorded. Normally, a plurality of clusters form a file, and chain information of the clusters of the file is recorded in FAT1 or FAT2. In other words, in FAT1 or FAT2, information is recorded which indicates, among a plurality of clusters present in the partition, the sequential order of the start of a file, the sequential order of the next cluster, and the sequential order of the last cluster of the file.

Figure 4:
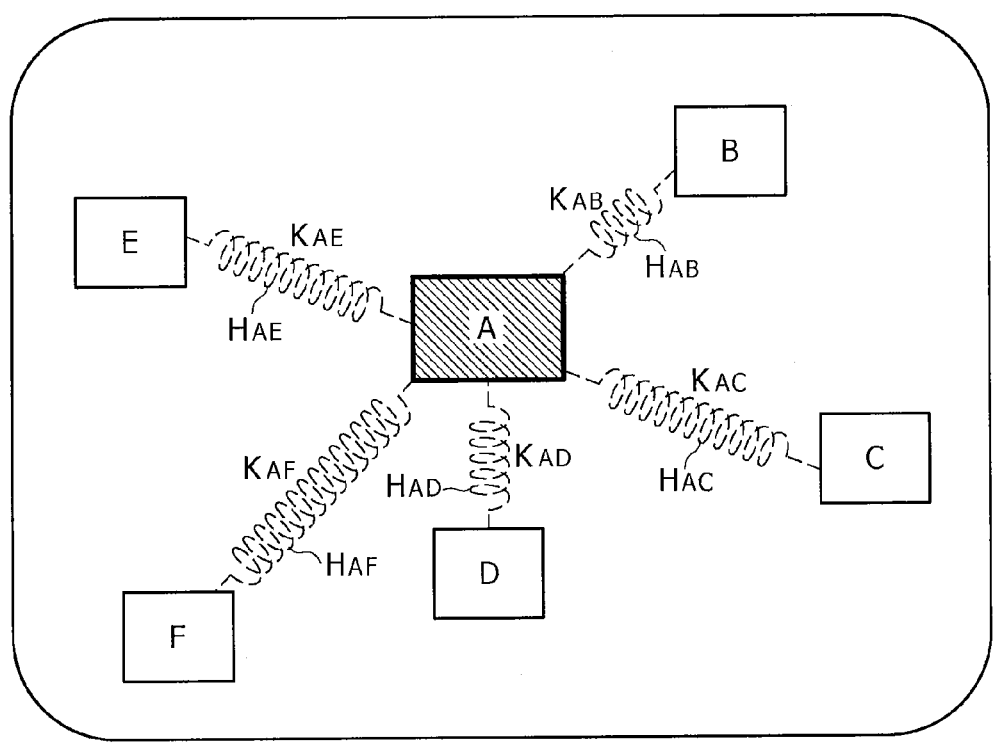
FIG. 4 is an illustration of another example of the configuration of data recorded in the recording medium shown in FIG. 2.

FIG. 4 shows a detailed example of the configuration of data recorded in the recording medium 204 when the file system 202 is based on FAT32.

The configuration shown in FIG. 4 differs from that shown in FIG. 3 in that the root directory entry is not located and in that FSInfo (file system information) is located which includes information concerning the number of free clusters for calculating a free storage size of the recording medium 204. In the other points, the configuration in FIG. 4 is identical to that in FIG. 3. According to FAT16 in FIG. 3, an area having a maximum of 2 GB can be managed as a partition. According to FAT32 in FIG. 4, an area having a maximum of 2 TB (terabytes) can be managed as a partition.

Figure 5:
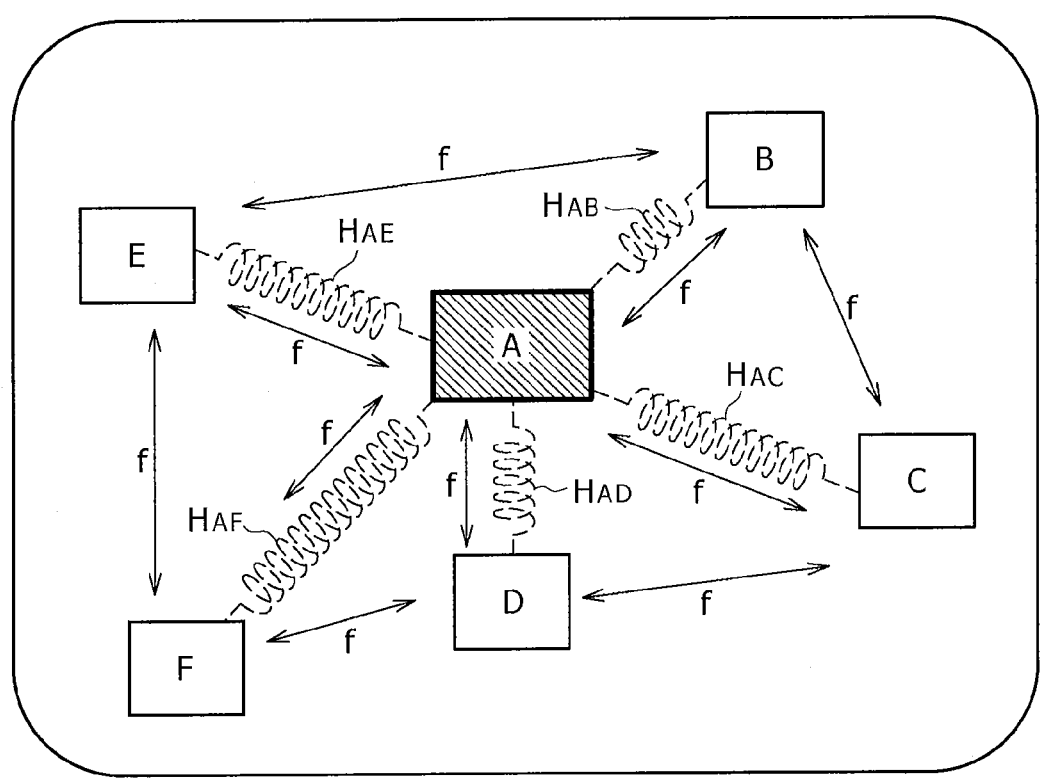
FIG. 5 is an illustration of an example of the configuration of the MBR shown in FIG. 3 or 4.

FIG. 5 shows an example of the configuration of the MBR shown in FIG. 3 or 4. FIG. 5 horizontally shows 16-byte data from the 0th data item to the 15th data item, and shows a total of 512 bytes (the 000-th byte to the 01FF-th byte) of data. In a start cluster formed by 512-byte data of the MBR, a 446-byte activation code area 251, a 64-byte partition table 252, and 2-byte information 261 are located. The activation code area 251 is an area starting at the 0th byte (at the start of the cluster) to the 445th byte. In the activation code area 251, a master boot code (initial program loader) for loading an activation program from an active partition is recorded. In addition, the partition table 252, which is formed by a 64-byte area starting at the 446th byte, and the information 261, which consists of last two bytes ("55h" and "AAh") as information representing a termination of the partition table 252, are recorded. In the partition table 252, partition information (a start address of a partition and its size) corresponding to each partition is recorded. For example, when one partition is registered, the partition table 252 is formed as shown in FIG. 6.

Figure 6:
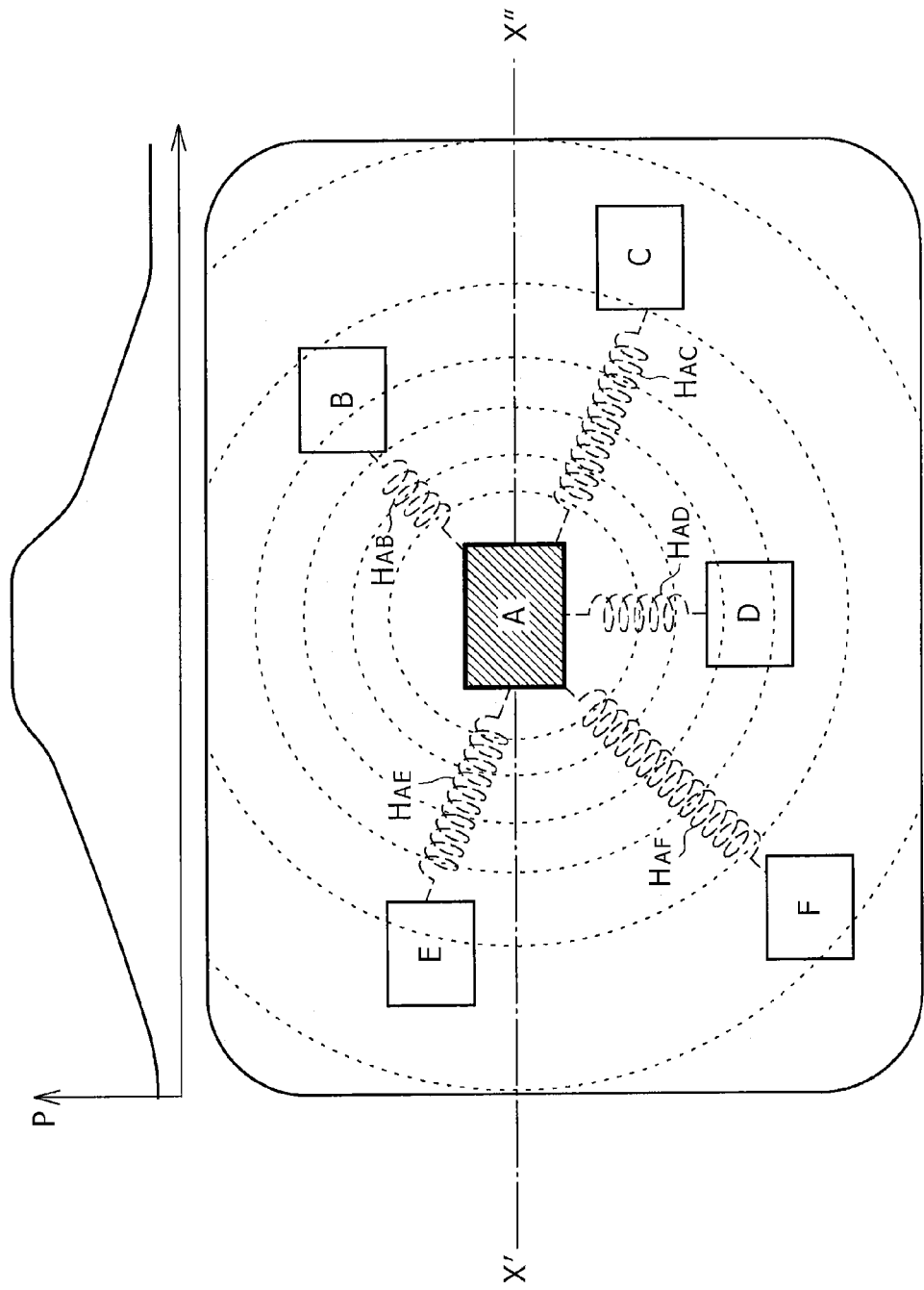
FIG. 6 is an illustration of an example of data recorded in the partition table shown in FIG. 5.

FIG. 6 shows a detailed example of the configuration of the partition table 252. When one partition is recorded in the recording medium 204, 16-byte partition information 271 (entry of the partition table 252) is stored in the partition table 252. The partition information 271 includes, in order from the beginning, a 1-byte flag 281, a 3-byte start sector (CHS (cylinder/head/sector)) 282, a 1-byte type 283, a 3-byte end sector (CHS) 284, a 4-byte start sector (LBA) 285, and a 4-byte partition size 286.

The flag 281 is a so-called "activation flag" indicating whether the partition is active. When the flag 281 is, for example, "00h", it is indicated that the partition is non-active (the partition is not a so-called "activation partition"). When the flag 281 is, for example, "80h", it is indicated that the partition is active (the partition is the so-called "activation partition"). The representations "h" (abbreviation of a hexadecimal number) of "00h" and "80h" indicate that "00" and "80" are represented in hexadecimal number. In the following description, values bearing "h" indicate hexadecimal representations.

The start sector 282 represents the address of a start sector of the partition by using three parameters, a cylinder, a head, and a sector. The type 283 represents the type of a file system in which the partition is formatted. When the type 283 is, for example, "80h", it is indicated that the type of the file system is FAT32.

The end sector 284 represents the address of an end sector in the partition by using three parameters, a cylinder, a head, and a sector. The start sector 285 represents the address, based on LBA, of a start sector in the partition. The partition size 286 represents a total number of sectors included in the partition.

Figure 7:
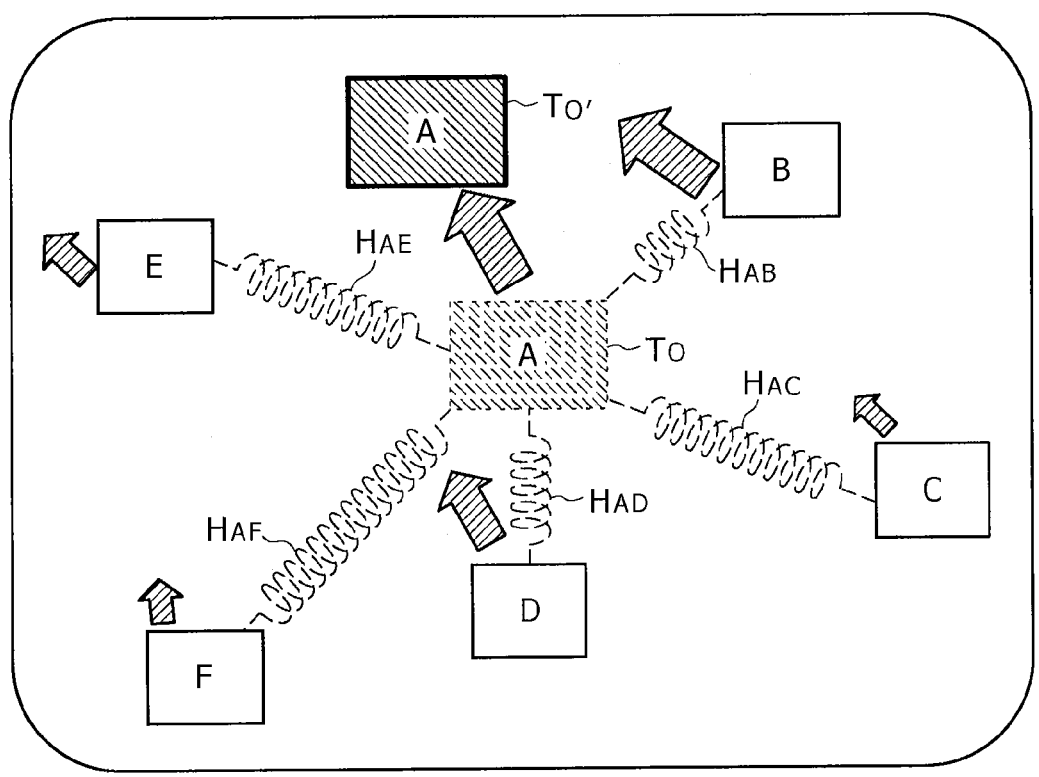
FIG. 7 is an illustration of an example of the configuration of the FAT shown in FIG. 3 or 4.

FIG. 7 shows an example of the above FAT. In FIG. 7, rectangles in the second to fifth rows from the top and in the second to seventeenth columns from the left indicate entries, respectively. Combinations of numeric values in the top row and numeric values in the most left column represent the address of the entries.

For example, in the case of FAT32, a numeric value in one entry represents the number of the next entry. In FIG. 7, "RSV" in an entry at an address of "00000000h" or "00000001h" indicates that a cluster having a cluster number of "00000000h" or "00000001h" is a reserved area for use in Microsoft Windows. In addition, "EOF (end of file)" in an entry at an address of "00000003h" or the like represents the end of the file. The representation "-" in an entry of "00000002h" represents "00000000h" and indicates that the entry is "unused".

In FAT32, when each file is recorded, a directory entry (described later) is created. In the directory entry, with information such as a file name, a date and time of creation, and a file size, a start cluster number of the file is stored. When the file is accessed, after the start cluster number in the directory entry is referred to, accessing of the file is performed while finding next cluster numbers by referring to the FAT. The FAT example shown in FIG. 7 shows the addresses of clusters in which real data for four files is recorded.

When "00000007h" is represented as a start cluster number in a directory entry corresponding to one file, "00000008h" is stored in an entry at an address of "00000007h", "00000009h" is stored in an entry at an address of "00000008h", and "EOF" is stored at an address of "00000009h". Thus, in a cluster having a cluster number of "00000007h", a cluster having a cluster number of "00000008h", and a cluster having a cluster number of "00000009h", real data of the file related to the directory entry in which "00000007h" is represented as the start cluster number is sequentially recorded.

In addition, when 0000000Ah is represented as a start cluster number in a directory entry corresponding to one file, "0000001Fh", "00000025h", "00000031h", "00000030h", and "EOF" are respectively stored in entries at addresses of "0000000Ah", "0000001Fh", "00000025h", "00000031h", and "00000030h". Thus, in a cluster having a cluster number of "0000000Ah", a cluster having a cluster number of "0000001Fh", a cluster having a cluster number of "00000025h", a cluster having a cluster number of "00000031h", and a cluster having a cluster number of "00000030h", real data of the file related to the directory entry in which "0000000Ah" is represented as the start cluster number is sequentially recorded.

When "0000001Bh is represented as a start cluster number in the directory entry corresponding to one file, "00000011h", "00000012h", "00000013h", "00000014h", "00000003h", and "EOF" are respectively stored in entries at addresses of "0000001Bh", "00000011 h", "00000012h", "00000013h", "00000014h", and "00000003h". In a cluster having a cluster number of "0000001Bh", a cluster having a cluster number of "00000011h", a cluster having a cluster number of "00000012h", a cluster having a cluster number of "00000013h", an a cluster having a cluster number of "00000014h", an a cluster having a cluster number of "00000003h", real data of the file related to the directory entry in which "0000001Bh" is represented as the start cluster number is sequentially recorded.

In addition, when "0000002Ch" is represented as a start cluster number in a directory entry corresponding to one file, "0000002Dh", "0000002Eh", "0000002Fh", "00000038h", "00000039h", "0000003Ah", "0000003Bh", and "EOF" are respectively stored in entries at addresses of "0000002Ch", "0000002Dh", "0000002Eh", "0000002Fh", "00000038h", "00000039h", "0000003Ah", and "0000003Bh". Thus, in a cluster having a cluster number of "0000002Ch", a cluster having a cluster number of "0000002Dh", a cluster having a cluster number of "0000002Eh", a cluster having a cluster number of "0000002Fh", a cluster having a cluster number of "00000038h", a cluster having a cluster number of "00000039h", a cluster having a cluster number of "0000003Ah", a cluster having a cluster number of "0000003Bh", real data of the data related to the directory entry in which "0000002Ch" is represented as the start cluster number is sequentially recorded.

FIG. 8 shows an example of the structure of the directory entry related to the file in FAT32. The numeric values 0 to IF written in a row at the top of FIG. 8 are hexadecimal numbers representing the number of bytes starting at zero.

A 7-byte name 331 at the start of the directory entry represents a file name. A 3-byte extension name 332 that follows the name 331 represents a file extension (for example, "mpg" in the case of an MPEG2 format, and "mp3" in the case of MP3 (MPEG Audio Layer-3)). A 1-byte attribute 333 that follows the extension name 332 represents a file attribute. The file attribute represents, for example, a read-only file or a hidden file. A 1-byte reserved area 334 that follows the attribute 333 is an unused area.

A 3-byte time of creation 335 that follows the reserved area 334 represents a time that the file is created. A 2-btye date of creation 336 that follows the time of creation 335 represents a date on which the file is created. A 2-byte last access date 337 that follows the date of creation 336 represents the last date on which the file is accessed.

The start cluster number (position) is represented in a form divided into a 2-byte start cluster number (high) 338 representing an upper part of the start cluster number and a 2-byte start cluster number (low) 341 representing a lower part of the start cluster number. In other words, the start cluster number (position) is represented by 32 bits. The size of the file is stored in a 4-byte file size 342.

A 2-byte time of recording 339 represents a time that the file is recorded, that is, a time that the file is last updated (last written). A 2-byte date-of-recording field 340 represents a date on which the file is recorded, that is, a date on which the file is last updated (last written).

In the directory entry, following the last access date 337, the start cluster number (high) 338, the time of recording 339, the date-of-recording date 340, the start cluster number (low) 341, and the file size 342 are located in order.

As described above, file accessing on the basis of the file system 202 such as FAT32 is performed by referring to a FAT. For example, when a file is read, reference to the FAT is frequently performed. Thus, for faster file reading, it is preferable to perform fast accessing of the FAT. In recent years, at the time of system initial processing, by loading a FAT from an HDD into a buffer memory formed by a RAM or SDRAM capable of fast reading, and executing file accessing while referring to the FAT stored in the buffer memory, a technique, such as reducing a time necessary for referring to the FAT, is performed.

However, when an HDD having, for example, 30 GB, is formatted, with the cluster size set to 32 KB, the size of the FAT reaches nearly 4 MB. For example, in order for the recording-playback apparatus 100 to be inexpensively produced in small size, the storage size of a buffer memory such as the RAM 141 should be limited, so that it is difficult to store a large storage size FAT.

In addition, as described above, in the drive 145 of the recording-playback apparatus 100, a plurality of types of recording media can be loaded. For example, a recording medium, such as a flash memory, is normally capable of faster reading and writing compared with a recording medium such as an HDD (magnetic disk). By using the file system 202 to manage a file of video data processed by the recording-playback apparatus 100 with the FAT and to record the file and the FAT in the flash memory, the FAT recorded in the flash memory is referred to when the file is read, and faster reading of the file can be performed compared with a case in which a file, such as video data, is recorded in the HDD.

However, a common flash memory has a storage size of approximately several hundred megabytes. Accordingly, in order to record a large amount of data such as video data, a recording medium, such as an HDD, having a storage size of several hundred megabytes, is necessary.

Accordingly, in an embodiment of the present invention, the types (for example, two types) of recording media loaded into the drive 145 are used as if they were handled as a single recording medium.

Figure 9:
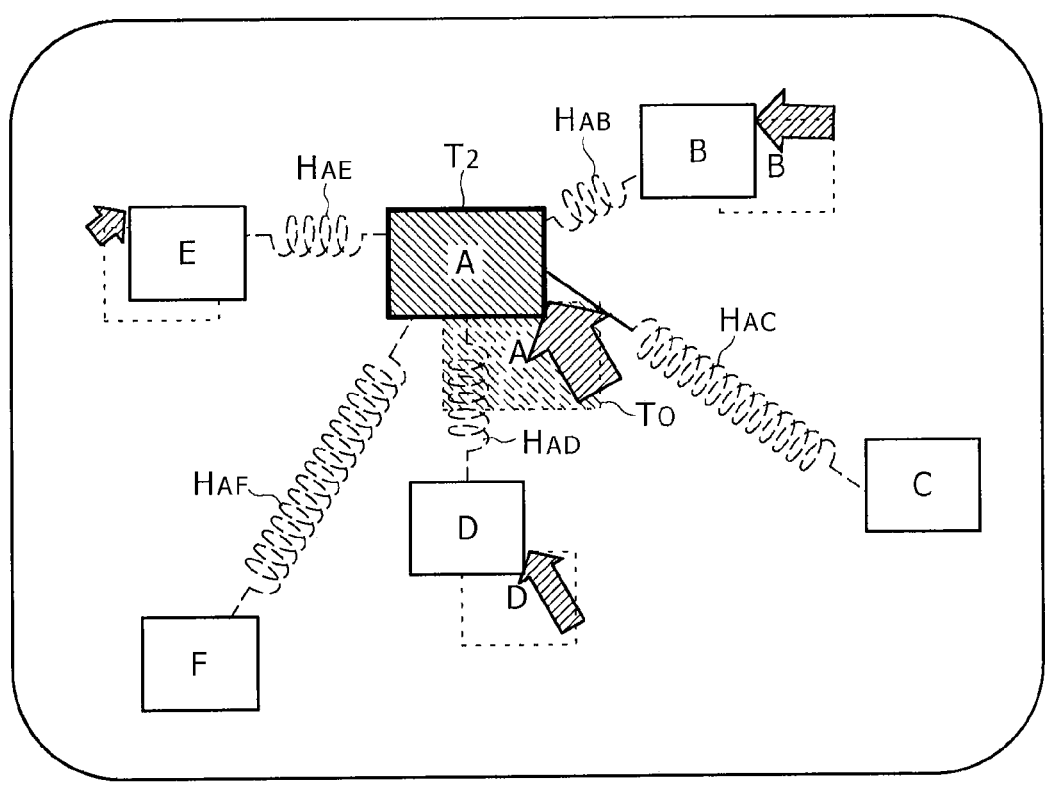
FIG. 9 is an illustration of an example of the configuration of data recorded in recording media managed as an integrated medium.

For example, when two types of recording media, the flash memory and the HDD, are loaded into the drive 145, as shown in FIG. 9, both recording media are managed in the file system 202 as if both were handled as a single recording medium, and the data having the configuration described with reference to FIG. 3 is recorded in the recording medium. Management of a plurality of media as if the media were handled as a single medium, as shown in FIG. 9, is called "integrated medium management" in the embodiment of the present invention.

FIG. 9 shows an example of the configuration of data recorded both in the flash memory and in the HDD when the file system 202 is based on FAT16. The data shown in FIG. 9 is similar in configuration to that shown in FIG. 3. As shown in FIG. 9, in the flash memory, the data starts in order from an MBR at the start (the portion represented by LBA=0 in FIG. 3) of the data, and is located in order from the portion represented by LBA=0 to the portion which is represented by LBA=X and which is the last sector of the flash memory. In other words, the MBR, a predetermined free area, a PBR, FAT1, FAT2, a root directory entry, and clusters are located in order from the start sector (the portion represented by LBA=0) of the flash memory.

In addition, data (a plurality of clusters in this case) that follows the last sector (the portion represented by LBA=X) of the flash memory is located in the HDD. Specifically, the clusters are located in order from the portion represented by LBA=0. In other words, the clusters are located in order from the start sector (the portion represented by LBA=0) in the HDD, but data, such as an MBR, a predetermined free area, a PBR, FAT1, FAT2, and a root directory entry, is not located in the HDD. In this case, the clusters can be located up to the last sector (the portion represented by LBA=Y) of the HDD.

In the integrated medium shown in FIG. 9, the management information that includes FAT1 or FAT2 which are frequently referred to when a file is read is recorded in the flash memory, which is capable of relatively fast reading and writing, while real data exceeding the storage size of the flash memory, that is, real data whose recording into the flash memory is difficult, is recorded in the HDD, which has a large storage size, and which needs a relatively long time for reading and writing.

As described above, by using the flash memory and the HDD as an integrated medium, faster file reading can be performed compared with the case of recording all the data in the HDD, and larger size data can be recorded compared with the case of recording all the data in the flash memory.

Figure 10:
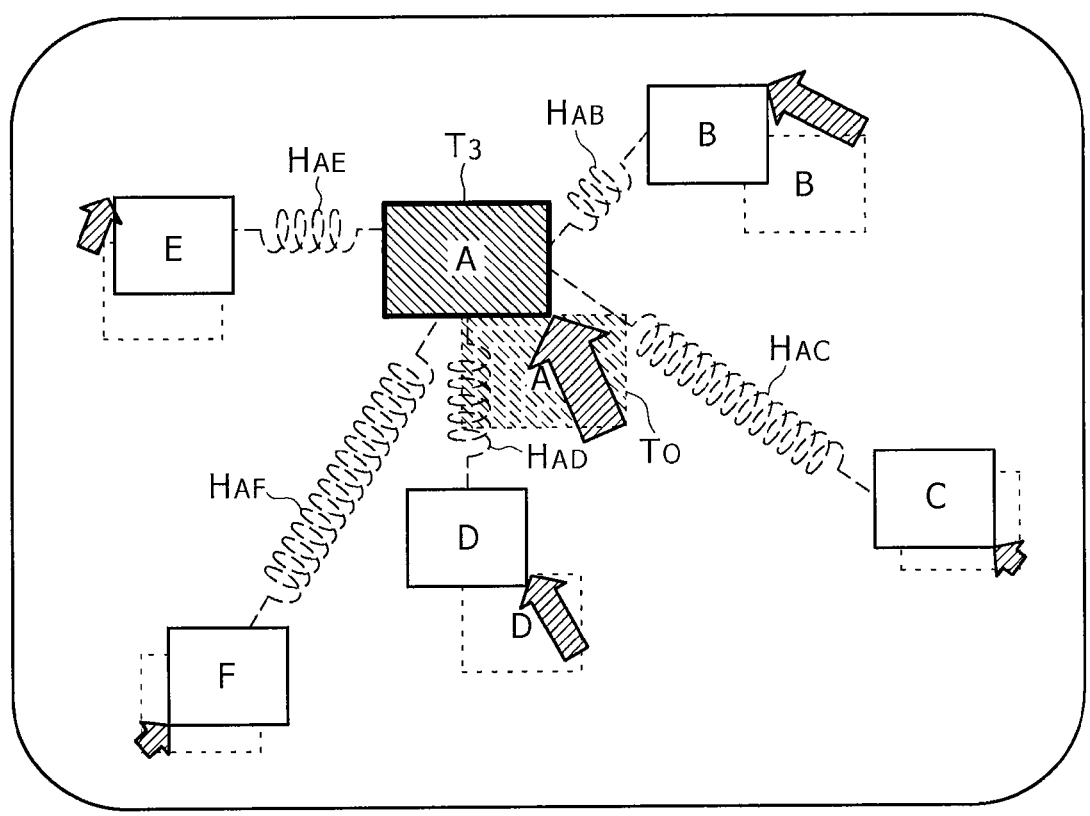
FIG. 10 is an illustration of another example of the configuration of data recorded in recording media managed as an integrated medium.

When the file system 202 is based on FAT32, an example of the configuration of data recorded both in the flash memory and in the HDD is as shown in FIG. 10. The data shown in FIG. 4 is similar in configuration to that shown in FIG. 4. Also in this case, management information including FAT1 or FAT2 is recorded in the flash memory, which is a medium capable of relatively fast reading and writing, while real data exceeding the storage size of the flash memory, that is, real data whose recording into the flash memory is difficult, is recorded in the HDD, which has a large storage size, and which needs a relatively long time for reading and writing.

Figure 11:
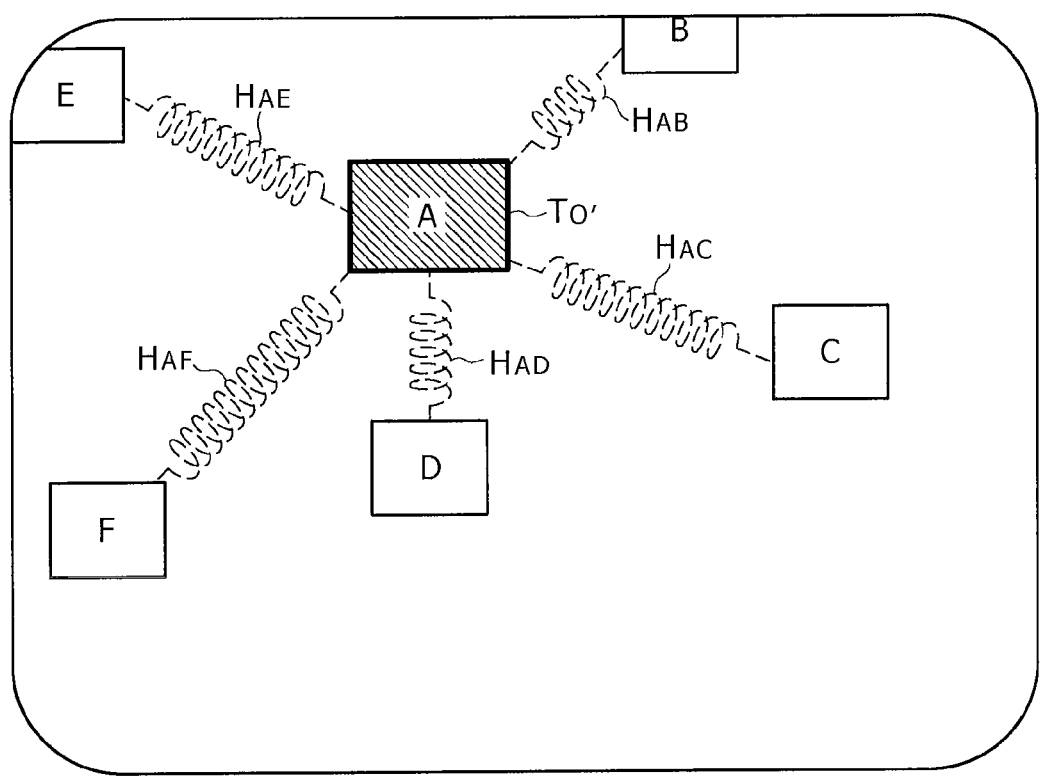
FIG. 11 is a block diagram showing an example of a functional configuration of software executed by the CPU shown in FIG. 1.

When a plurality of media, for example, medium A and medium B, are used as an integrated medium, As shown in FIG. 11, an integrated device driver 401 included in the device driver 203 controls device driver A that controls accessing of medium A and device driver B that controls accessing of medium B, whereby, in response to an access request from the file system 202, data is read from and written in the recording medium 204, which includes two media, medium A and medium B. Accordingly, for the file system 202, medium A and medium B are regarded as if both were handled as a single medium.

Next, a medium formatting process of the recording-playback apparatus 100 is described below with reference to the flowchart shown in FIG. 12. This process is executed when, for example, a command or the like that commands execution of formatting of a recording medium loaded into the drive 145 is input through the operation input unit 143 of the recording-playback apparatus 100.

In this case, two recording media, medium A as the flash memory and medium B as the HDD, are loaded into the drive 145 of the recording-playback apparatus 100. Prior to the process, the integrated device driver 401 acquires beforehand information indicating (for example, each loaded medium is a flash memory or HDD) which types of media are loaded into the drive 145. By referring to a table having correspondences between medium types stored beforehand and reading (or writing) speeds, the integrated device driver 401 can identify which of the presently loaded media is capable of relatively fast reading and writing.

In step S101, an application program which is included in the file system 202 and which executes medium formatting receives a selection of a formatting method. At this time, on the basis of, for example, information input by using the operation input unit 143, it is selected which method is used between formatting of the media by handling the media as an integrated medium, and separately formatting of the media.

In step S102, it is determined whether the formatting method selected in step S101 is "integrated medium formatting". If, in step S102, it is determined that the formatting method selected in step S101 is "integrated medium formatting", the process proceeds to step S103.

Figure 13:
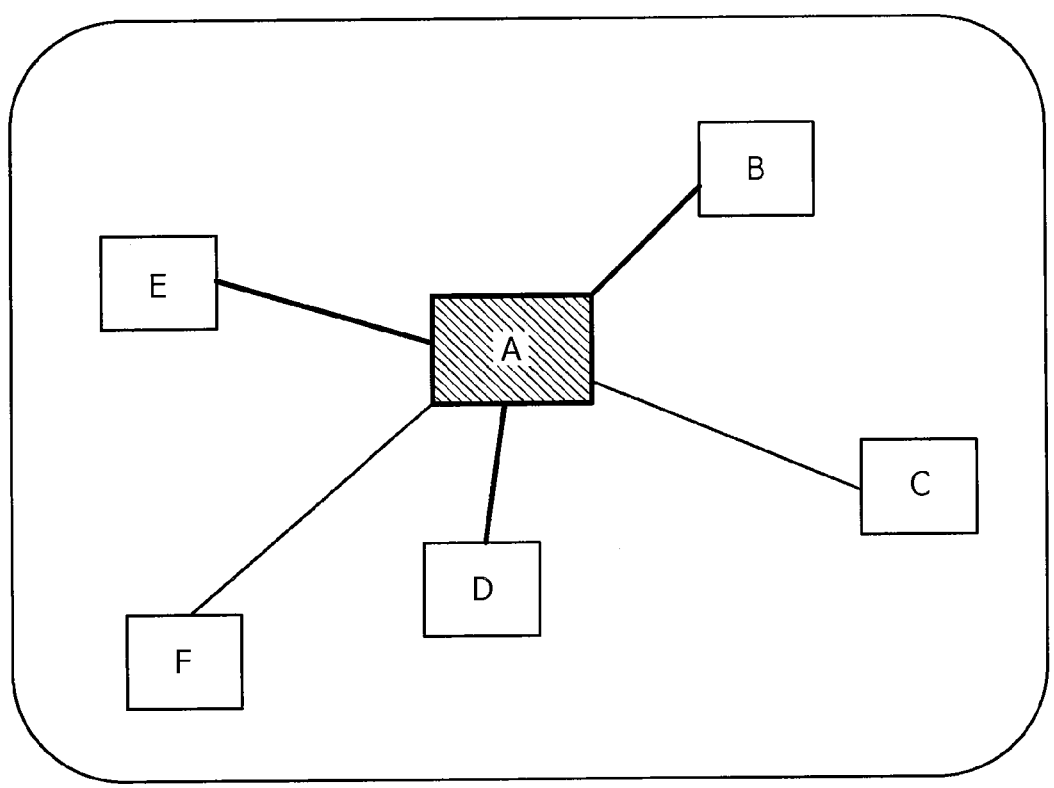
FIG. 13 is a flowchart illustrating an integrated medium-formatting process.

In step S103, the integrated device driver 401 executes an integrated medium formatting process, which is described later with reference to FIG. 13. This formats medium A and medium B, with both media handled as an integrated medium.

Figure 12:
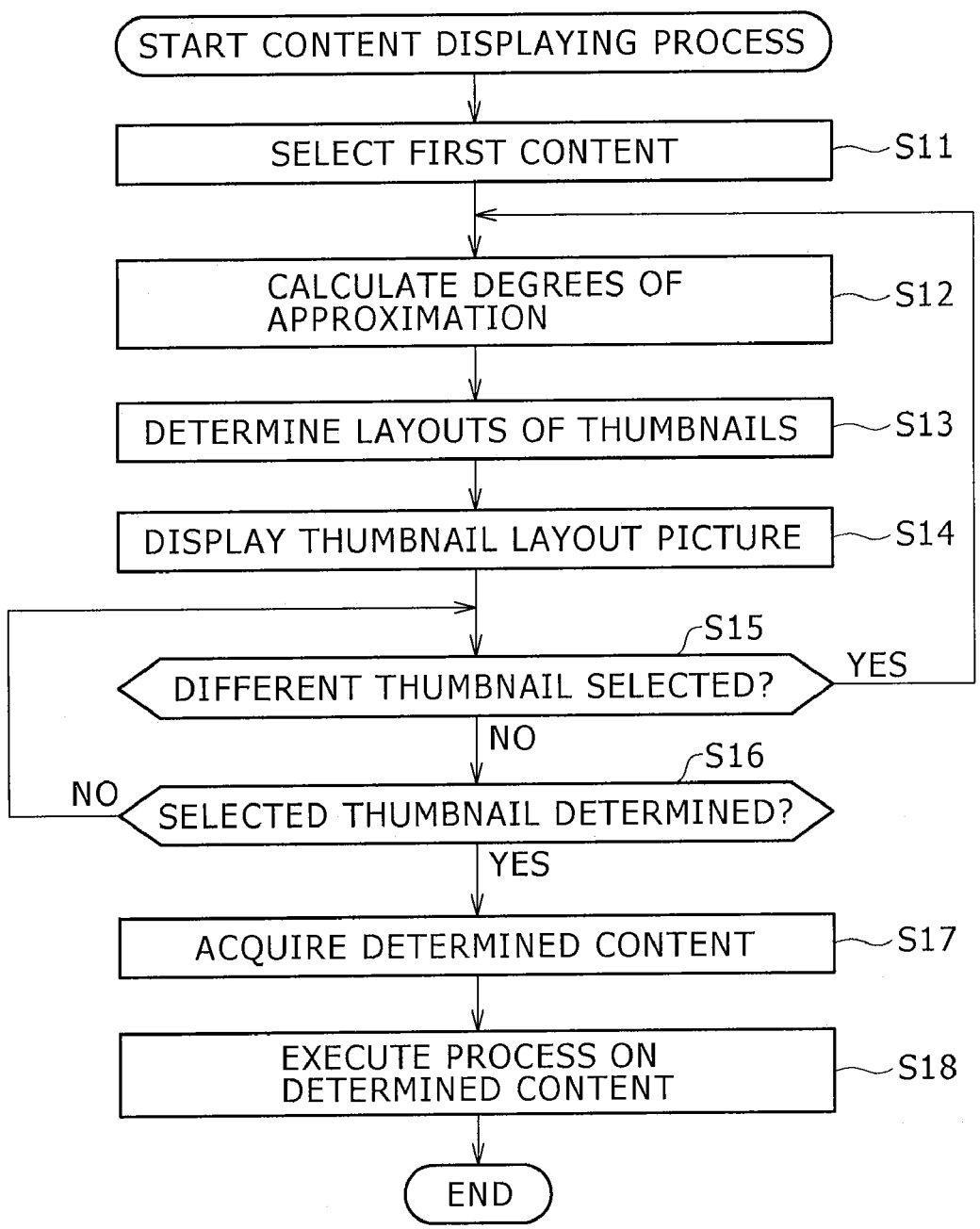
FIG. 12 is a flowchart illustrating a medium formatting process.

Here, details of the integrated medium formatting process in step S103 in FIG. 12 are described below with reference to the flowchart shown in FIG. 13.

In step S131, the integrated device driver 401 acquires the recording size of medium A. When medium A (flash memory) has, for example, a value of "0" to "X" as an LBA value, as shown in FIG. 9 or 10, the recording size of medium A is represented by "X+1".

In step S132, the integrated device driver 401 acquires the recording size of medium B. When medium B (HDD) has, for example, a value of "0" to "Y" as a LBA value, as shown in FIG. 9 or 10, the recording size of medium B is represented by "Y+1".

In step S133, the integrated device driver 401 creates an MBR at a position, represented by LBA=0, of medium A between two media, which is a flash memory capable of relatively fast reading and writing. As described above, the MBR includes information such as start and end sectors of each partition and its size. In step S133, the MBR is created so that a total number of sectors from the start sector to the end sector is the sum (represented by "X+Y+2") of the recording size "X+1" (of medium A) acquired and the recording size "Y+1" (of medium B) acquired in step S132.

The value "X", "Y", or the like of medium A or medium B can be used as an address for specifying a sector of medium A or medium B. The number of sectors of medium A can be represented by "X+1", and the number of sectors of medium B can be represented by "Y+1". Therefore, the sum "X+Y+2" of the recording sizes of medium A and medium B can replace the total number of sectors of the integrated medium.

In step S134, the integrated device driver 401 stores a branch point "X". The branch point is an address serving as a boundary between medium A and medium B in the integrated medium. In this case, a point, represented by LBA=X, corresponding to the last sector of medium A as the flash memory, serves as the branch point. Information of the branch point is recorded (stored) in, for example, a predetermined area set beforehand in medium A or medium B.

In step S135, the integrated device driver 401 formats medium A and medium B while handling both as the integrated medium.

As described above, medium A and medium B are formatted as the integrated medium. As a result, as shown in FIG. 9 or 10, two media can be used as a single medium.

Referring back to FIG. 12, if, in step S102, it is determined that the formatting method is not the "integrated medium formatting", the process proceeds to step S104.

Figure 14:
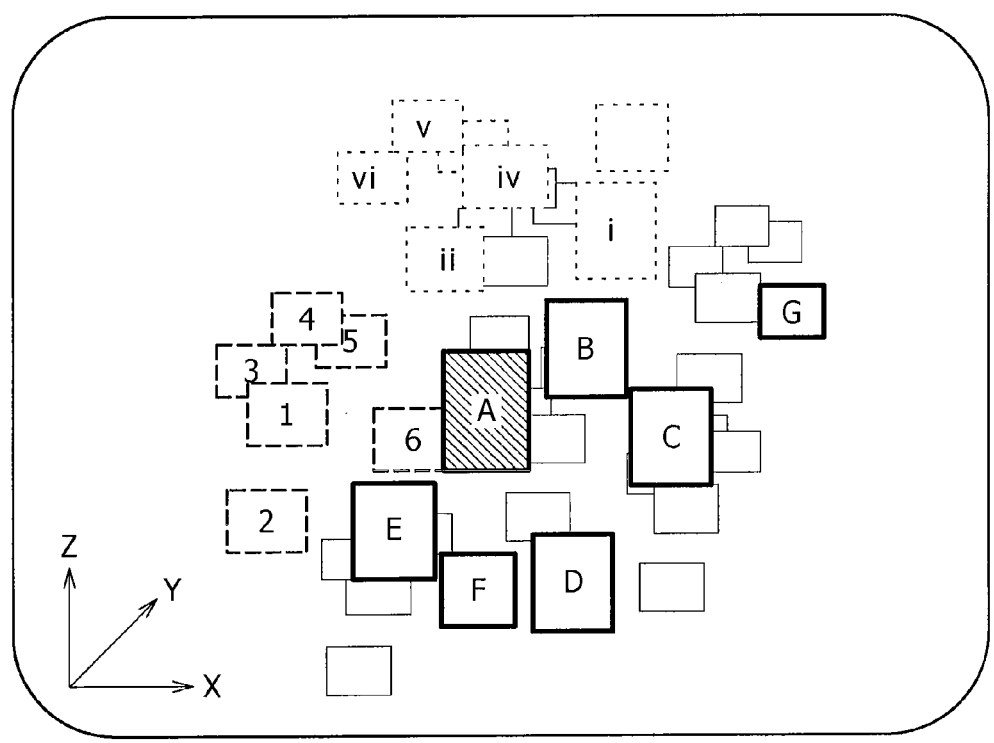
FIG. 14 is a flowchart illustrating a separately medium-formatting process.

In step S104, the integrated device driver 401 executes a separately medium-formatting process, which is described later with reference to FIG. 14. This separately formats medium A and medium B (not as the integrated medium).

Details of the separately medium-formatting process in step S104 in FIG. 12 are described below with reference to the flowchart shown in FIG. 14.

In step S151, the integrated device driver 401 acquires the recording size of medium A. When medium A (flash memory) has, for example, a value of "0" to "X" as an LBA value, as shown in FIG. 9 or 10, the recording size of medium A is represented by "X+1".

In step S152, the integrated device driver 401 creates an MBR at a position, represented by LBA=0, of medium A. As described above, the MBR includes information such as start and end sectors of each partition and its size. Here, the MBR is created so that a total number of sectors from the start sector to the end sector is the recording size "X+1" (of medium A) acquired in step S151.

In step S153, the integrated device driver 401 formats medium A.

In step S154, the integrated device driver 401 acquires the recording size of medium B. When medium B (HDD) has, for example, a value of "0" to "Y" as an LBA value, as shown in FIG. 9 or 10, the recording size of medium B is represented by "Y+1".

In step S155, the integrated device driver 401 creates an MBR at a position, represented by LBA=0, of medium B. Here, the MBR is created so that a total number of sectors from the start sector to the end sector is the recording size "Y+1" (of medium B) acquired in step S154.

In step S156, the integrated device driver 401 formats medium B.

As described above, medium A and medium B are separately formatted.

Figure 15:
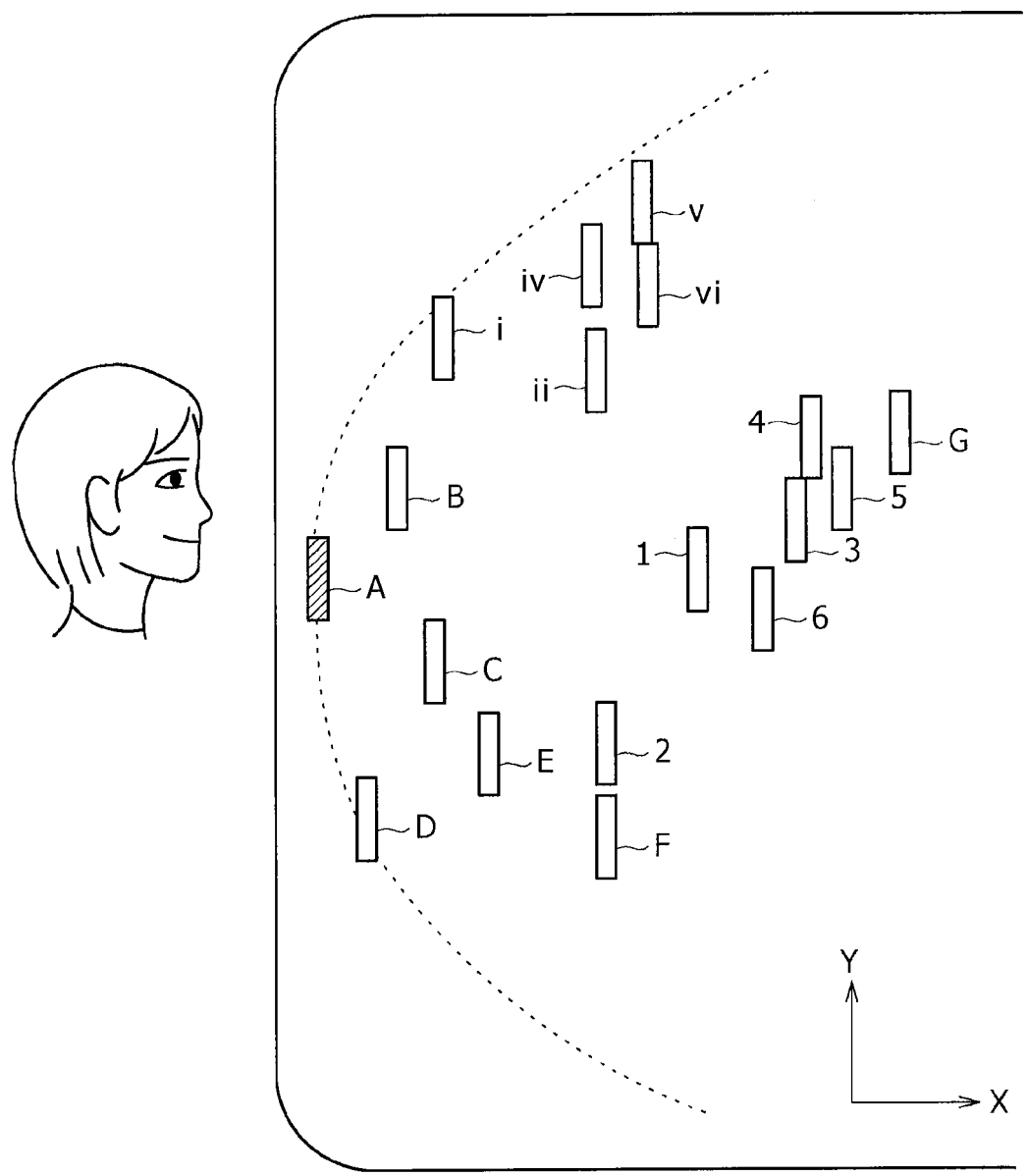
FIG. 15 is a flowchart illustrating a data reading/writing process.

Next, a data reading/writing process for reading/writing data in the recording medium 204, which includes medium A and medium B formatted as the integrated medium, is described below with reference to the flowchart shown in FIG. 15.

In step S201, the integrated device driver 401 determines whether or not it has been requested by the file system 202 to read or write a cluster. The integrated device driver 401 is on standby until it determines that it has been requested.

In step S202, the integrated device driver 401 checks an LBA value of the cluster whose reading or writing is determined in step S201 to be requested. In step S202, LBA values of sectors forming the cluster is checked.

In step S203, the integrated device driver 401 determines whether or not the LBA value of the cluster checked in step S202 is not greater than branch point "X" stored in step S134. If it is determined that the LBA value is not greater than branch point "X", the process proceeds to step S204.

In step S204, the integrated device driver 401 notifies the LBA value of device driver A. In other words, if the LBA value is not greater than the value "X", the cluster is recorded in medium A as the flash memory. Accordingly, the device driver A for controlling medium A is notified of the LBA value.

In step S205, the integrated device driver 401 controls the device driver A to read or write the cluster of medium A.

If, in step S203, it is determined that the LBA value of cluster checked in step S202 is greater than "X", the process proceeds to step S206.

In step S206, the integrated device driver 401 notifies device driver B of the "value of X that is the LBA value". Specifically, when the "LBA value" is greater than "X", the cluster is recorded in medium B as the HDD. Accordingly, device driver B for controlling medium B is notified of the "value of X that is the LBA value".

In this case, medium B as well as medium A are formatted as the integrated medium. Thus, the file system 202 recognizes that the total number of sectors of the integrated medium is "X+Y+2", and both the cluster recorded in medium A and the cluster recorded in medium B can be specified on the basis of consecutive LBA values and can be accessed. However, actually, when the LBA value is greater than "X", in order to access the cluster, it is necessary to specify the cluster by using the LBA value unique to medium B as the HDD. Accordingly, in step S206, device driver B is notified of, as the LBA value, the "value of X that is the LBA value".

After step S205 or S207, the process proceeds to step S208, and the integrated device driver 401 outputs a response to the access request from the file system 202.

As described above, accessing, such as data reading or writing, of the integrated medium is controlled.

A case has been described in which management information including FAT1 or FAT2, as well as an MBR, a PBR, FSInfo, or a root directory entry, is recorded in the flash memory capable of relatively fast reading and writing, and in which real data exceeding the recording size of the flash memory, that is, real data whose recording into the flash memory is difficult, is recorded in the HDD which is a mass storage medium that needs a relatively long time for reading and writing. The directory entry described above with reference to FIG. 8 is also information that is frequently referred to in the case of file reading. Accordingly, in order to realize faster file accessing, it is preferable that also the directory entry be recorded as management information in the flash memory as a medium capable of relatively fast reading and writing.

Figure 16:
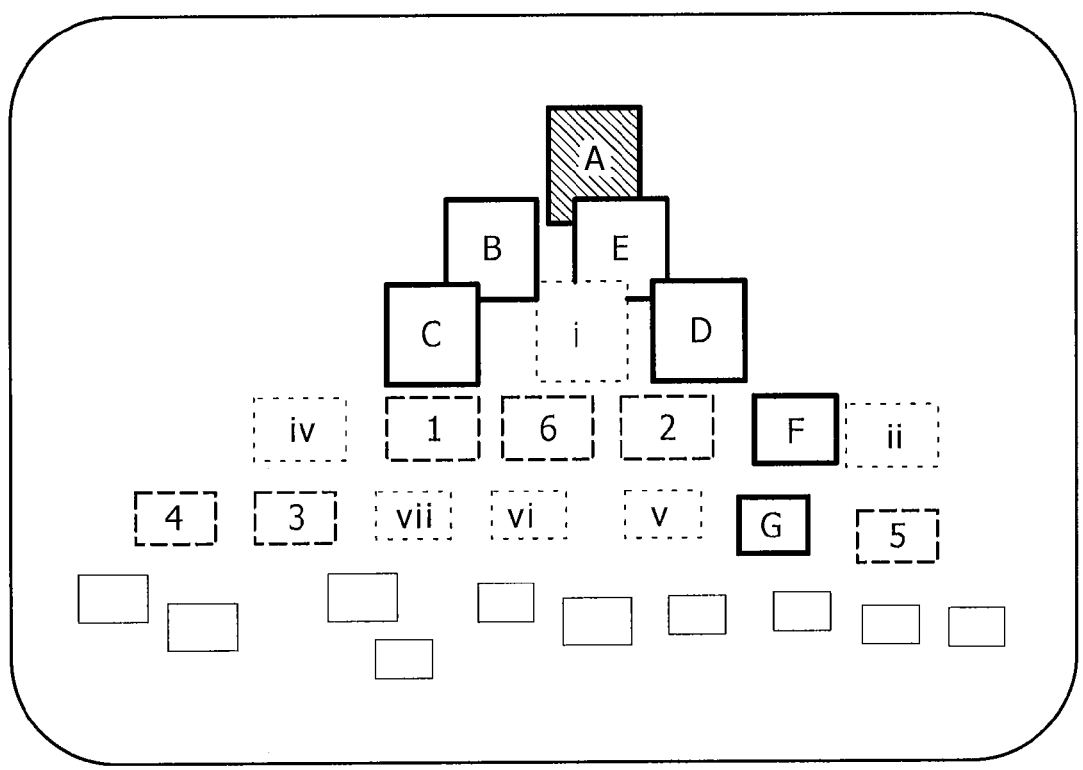
FIG. 16 is a flowchart illustrating a file recording process.

In the above case, in the case of file recording, the directory entry may collectively be recorded in the flash memory. FIG. 16 is a flowchart illustrating a file recording process performed when the directory entry is collectively recorded in the flash memory.

In step S301 in FIG. 16, an application program which is included in the application 201 and which executes a file recording process specifies a file name and outputs a creating command to create a new file. The process proceeds to step S302.

In step S302, in response to the file creating command from the application program, the file system 202 searches the flash memory (medium A), as a medium capable of relatively fast reading and writing, for a free area in the directory entry in which a new file directory entry is recorded. The process proceeds to step S303.

In step S303, the file system 202 records the new file directory entry in a cluster detected in the result of searching for the free area of the directory entry in step S302. The process proceeds to step S304.

In step S304, the file system 202 searches medium B different from medium A for a free cluster in the real data area for real data of the new file is recorded. The process proceeds to step S305.

In step S305, the application program initiates outputting the real data (e.g., image data) of the new file to the file system 202. The process proceeds to step S306.

In step S306, the file system 202 records the real data in the free cluster detected in the result of searching the free cluster in the real data area in step S304, and the process finishes.

In the above manner, the file is recorded. In the above manner, the directory entry is collectively recorded in the flash memory, whereby faster file accessing can be realized compared with, for example, a case in which the directory entry is recorded in the HDD.

Although an example in which two media, medium A and medium B, are formatted as if both were handled as an integrated medium have been described, three or more media may be formatted as if they were handled as an integrated medium.

For example, three or more (for example, n) media, such as medium A having a recording size represented by "X+1", medium B having a recording size represented by "Y+1", and medium C having a recording size represented by "Z+1", are formatted as if they were handled as an integrated medium, in step S133, the MBR may be created at the position represented by LBA=0 in medium A so that the total number of sectors is "X+Y+Z+ . . . +n", and, in step S134, branch points "X", "Y", "Z", . . . , may be stored.

Figure 17:
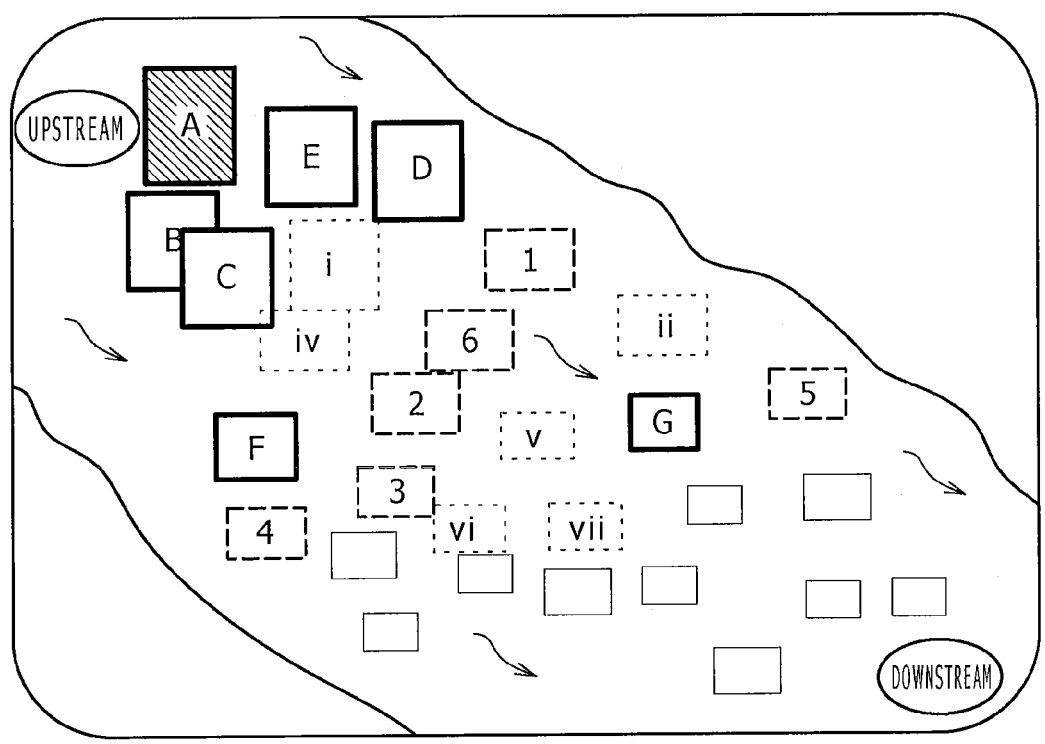
FIG. 17 is a block diagram showing an example of the configuration of a personal computer.

Although a case in which an embodiment of the present invention is applied to the recording-playback apparatus 100 has been described, an embodiment of the present invention may be applied to a multi-purpose personal computer. FIG. 17 is a block diagram showing an example of the configuration of a personal computer.

In FIG. 17, a CPU 501 executes various types of processing in accordance with a program stored in a ROM 502 or a program loaded from a storage unit 508 into a RAM 503. The RAM 503 may also store data, etc., which are necessary for the CPU 501 to execute the various types of processing.

The CPU 501, the ROM 502, and the RAM 503 are connected to one another by a bus 504. An input/output interface 505 is also connected to the bus 504.

The input/output interface 505 connects to an input unit 506 including a keyboard and a mouse, an output unit 507 including a display formed by a CRT (cathode ray tube) or LCD (liquid crystal display), and a speaker, a storage unit 508 including a hard disk, and a communication unit 509 including a modem and a network interface card such as a LAN card. The communication unit 509 performs communication processing by using networks including the Internet.

The input/output interface 505 connects to a drive 510, if necessary. A removable medium 511, such as a magnetic disk, a magneto-optical disk, or a semiconductor memory, is loaded in the drive 510. A computer program read from the removable medium 511 is installed into the storage unit 508, if necessary.

Consecutive processing as described above may be executed either by hardware or by software. When the consecutive processing is executed by software, a program forming the software is installed from a network such as the Internet or from a recording medium such as the removable medium 511.

Types of the recording medium include not only the removable medium 511, which is distributed separately from the personal computer 500 in order to provide programs to a user, and which includes a program-recorded magnetic disk (including a floppy disk), optical disk (including a CD-ROM (compact-disk read-only memory) and DVD (digital versatile disk)), magneto-optical disk (including an MD (Mini-Disk)), or semiconductor memory, but also the ROM 502, which is provided to the user in a state built into the personal computer 500 and which contains programs, and a hard disk included in the storage unit 508.

In this specification, steps constituting a program recorded in the recording medium definitely include processing steps executed in a time-series manner in given order, and include processing steps which are executed in parallel or separately if they are not necessarily executed in a time-series manner.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus for reading or writing information in a plurality of recording media, the information processing apparatus comprising:
   formatting determination means for determining, in the case of formatting the recording media, whether or not the recording media are to be formatted by handling the recording media as an integrated recording medium;
   integrated formatting means for formatting, when the formatting determination means determines that the recording media are to be formatted by handling the recording media as the integrated recording medium, the recording media by handling the recording media as the integrated recording medium and;
   wherein the integrated formatting means creates a master boot record of the integrated recording medium so that the sum of the numbers of sectors of the recording media is the number of sectors of the integrated recording medium.

2. The information processing apparatus according to claim 1, wherein the integrated formatting means locates the master boot record in a start sector which is included in the integrated recording medium and which is located in, among the recording media, a first recording medium capable of faster data reading and writing compared with the other recording media, and the integrated formatting means locates management information of the integrated recording medium so as to follow the master boot record.

3. The information processing apparatus according to claim 2, wherein the management information includes a file allocation table of the integrated recording medium.

4. The information processing apparatus according to claim 2, wherein the management information includes a directory entry.

5. The information processing apparatus according to claim 1, further comprising branch point storage means for storing, as a branch point, an address representing an end sector of a first recording medium among the recording media, the branch point being located between the first recording medium and a second recording medium among the recording media in which data having a recording size greater than a recording size of the first recording medium is recorded and which is used for data recording next to data recording in the first recording medium.

6. The information processing apparatus according to claim 5, wherein:
when data recorded in the integrated recording medium is accessed, the information processing apparatus determines whether or not an address representing the data is greater than a value representing the branch point;
when the address representing the data is greater than the value representing the branch point, the second recording medium is accessed; and
when the address representing the data is not greater than the value representing the branch point, the first recording medium is accessed.

7. An information processing method for reading or writing information in a plurality of recording media, the information processing method comprising the steps of:
in the case of formatting the recording media, performing determination of whether or not the recording media are to be formatted by handling the recording media as an integrated recording medium;
when the result of the determination indicates that the recording media are to be formatted by handling the recording media as the integrated recording medium, formatting the recording media by handling the recording media as the integrated recording medium and;
creating a master boot record of the integrated recording medium so that the sum of the numbers of sectors of the recording media is the number of sectors of the integrated recording medium.

8. A recording medium containing a computer-readable program for allowing an information processing apparatus to execute information processing, the information processing apparatus reading or writing information in a plurality of recording media, the program comprising the steps of:
in the case of formatting the recording media, controlling determination of whether or not the recording media are to be formatted by handling the recording media as an integrated recording medium;
when the result of the determination indicates that the recording media are to be formatted by handling the recording media as the integrated recording medium, controlling formatting of the recording media by handling the recording media as the integrated recording medium and;
creating a master boot record of the integrated recording medium so that the sum of the numbers of sectors of the recording media is the number of sectors of the integrated recording medium.

9. An information processing apparatus for reading or writing information in a plurality of recording media, the information processing apparatus comprising:
a formatting determination section configured to, in the case of formatting the recording media, determine whether or not the recording media are to be formatted by handling the recording media as an integrated recording medium;
an integrated formatting section configured to, when the formatting determination section determines that the recording media are to be formatted by handling the recording media as the integrated recording medium, format the recording media by handling the recording media as the integrated recording medium and;
wherein the integrated formatting section creates a master boot record of the integrated recording medium so that the sum of the numbers of sectors of the recording media is the number of sectors of the integrated recording medium.

* * * * *